(12) United States Patent
Klug et al.

(10) Patent No.: US 11,441,613 B2
(45) Date of Patent: Sep. 13, 2022

(54) OIL CONSUMING SYSTEM

(71) Applicant: Magna Powertrain GmbH & Co KG, Lannach (AT)

(72) Inventors: Joachim Klug, Stainz (AT); Christoph Krenn, St.Stefan ob Stainz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 17/059,337

(22) PCT Filed: Apr. 29, 2019

(86) PCT No.: PCT/EP2019/060880
§ 371 (c)(1),
(2) Date: Nov. 27, 2020

(87) PCT Pub. No.: WO2019/228730
PCT Pub. Date: Dec. 5, 2019

(65) Prior Publication Data
US 2021/0231178 A1 Jul. 29, 2021

(30) Foreign Application Priority Data
May 30, 2018 (DE) .......................... 102018208639.7

(51) Int. Cl.
*F16D 13/52* (2006.01)
*F16H 57/04* (2010.01)
(Continued)

(52) U.S. Cl.
CPC .............. *F16D 13/52* (2013.01); *F16D 13/72* (2013.01); *F16D 2048/0218* (2013.01); *F16H 57/0473* (2013.01)

(58) Field of Classification Search
CPC .......... F16N 19/00–006; F16N 39/002; F02M 37/0088–0094; F16H 57/045;
(Continued)

(56) References Cited

U.S. PATENT DOCUMENTS 3,964,587 A * 6/1976 Wang ...................... F16D 13/50
  192/113.34
4,664,144 A * 5/1987 Lemmon .............. B60K 15/077
  137/44
(Continued)

FOREIGN PATENT DOCUMENTS

DE  865176 C   1/1953
DE  1450254 B1 6/1970
(Continued)

OTHER PUBLICATIONS

International Search Report and Written Opinion of the International Searching Authority for International Application No. PCT/EP2019/060880 dated Aug. 29, 2019, Translation of International Search Report Included, 11 pages.

*Primary Examiner* — Ernesto A Suarez
*Assistant Examiner* — James J Taylor, II
(74) *Attorney, Agent, or Firm* — Dickinson Wright PLLC

(57) ABSTRACT

The invention is concerned with an oil consumer system having at least one rotating component and at least one oil supply from an oil tank, wherein the oil consumer system has an oil return to a first tank and an oil supply via at least one second tank.

10 Claims, 1 Drawing Sheet

(51) Int. Cl.
*F16D 48/02* (2006.01)
*F16D 13/72* (2006.01)

(58) Field of Classification Search
CPC .......... F16H 57/0453–0454; F16D 2048/0218; F16D 13/52; F16D 13/72–74
See application file for complete search history.

(56) References Cited

U.S. PATENT DOCUMENTS

| | | | |
|---|---|---|---|
| 5,020,566 A * | 6/1991 | Shoop | F02M 37/0088 |
| | | | 137/265 |
| 8,851,861 B2 | 10/2014 | Frait et al. | |
| 9,000,328 B2 * | 4/2015 | Helf | F04C 29/02 |
| | | | 219/133 |
| 9,291,212 B2 * | 3/2016 | Nett | F16H 57/0442 |
| 9,322,466 B2 * | 4/2016 | Ebner | F16H 57/045 |
| 9,423,017 B1 | 8/2016 | Francis et al. | |
| 9,739,363 B2 * | 8/2017 | Schweiher | F16H 57/0457 |
| 10,378,442 B2 * | 8/2019 | Jackowski | F02K 3/06 |
| 10,844,948 B2 * | 11/2020 | De Meerschman | F16H 57/0442 |
| 10,961,880 B2 * | 3/2021 | Karcher | F01M 1/02 |
| 2005/0173180 A1 * | 8/2005 | Hypes | F16H 48/30 |
| | | | 180/292 |
| 2020/0079212 A1 * | 3/2020 | Legl | F16H 57/0424 |
| 2020/0182347 A1 * | 6/2020 | Fleischmann | F16H 57/0436 |

FOREIGN PATENT DOCUMENTS

| | | |
|---|---|---|
| DE | 3544724 A1 | 6/1987 |
| DE | 4140667 A1 | 6/1993 |
| DE | 102012218054 B3 | 11/2013 |
| JP | H11197406 A * | 7/1999 |
| WO | 2013045445 A1 | 4/2013 |

* cited by examiner

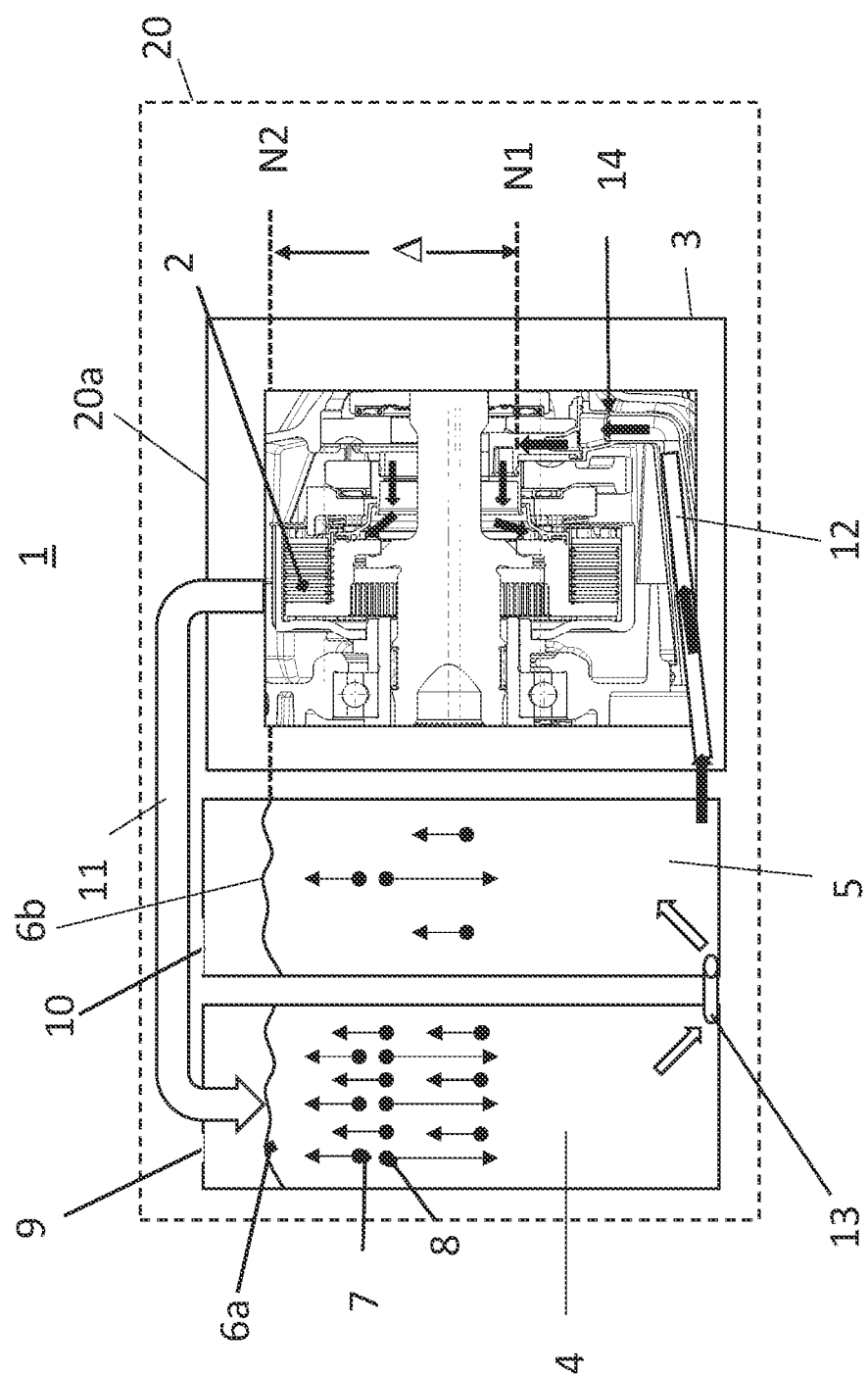

OIL CONSUMING SYSTEM

CROSS-REFERENCE TO RELATED APPLICATIONS

This application is a National Stage of International Application No. PCT/EP2019/060880, filed Apr. 29, 2019, which claims priority to DE102018208639.7, filed May 30, 2018. The entire disclosures of each of the above applications are incorporated herein by reference.

FIELD OF THE INVENTION

The invention relates to an oil consumer system having at least one rotating component and at least one oil supply from an oil tank.

BACKGROUND OF THE INVENTION

This section provides information related to the present disclosure which is not necessarily prior art.

In many oil consumer systems, such as a clutch system, the oil is a central component. It serves for cooling and lubricating. A number of operating properties of a clutch system are directly dependent on the material parameters of the oil. Important oil properties are thus, inter alia, the oil density, the viscosity as a function of the temperature, the compatibility of the oil with the various materials of the system, the air separation capability and the foam formation tendency.

Problems often arise as a result of the oil circulation times in oil consumer systems being very short. This means that the average residence time of the oil in the reservoir is too short for additionally received free air in the oil to be separated out. A high fraction of this undissolved air can result in foaming of the oil. If an oil-air mixture is used for cooling and lubrication, further problems can occur in the clutch system. The aspect of the cooling of the hot oil after use must also be taken into consideration.

A typical oil consumer system is a clutch system in which foamed, hot oil, which is flung out by the clutch, is collected in the oil sump and delivered again to the point of use via suitable lines and bores.

WO 2013045445 A1 discloses a clutch system having two individual clutches. In order to avoid drag losses of the rotating parts in the oil, the level of the oil sump is kept very low. The oil to be used for the clutches is raised to a higher level via a crown wheel. The clutch is oiled via oil supply ducts.

It is the object of the invention to provide an oil consumer system that minimizes the problems with hot, foamed oil, with drag losses in the oil being avoided.

SUMMARY OF THE INVENTION

This section provides a general summary of the disclosure, and is not a comprehensive disclosure of its full scope or all of its features.

The object is achieved by an oil consumer system having at least one rotating component and at least one oil supply from an oil tank, wherein the oil consumer system has an oil return to a first tank and an oil supply via at least one second tank.

By using at least two tanks, the foamed oil is freed from entrained air and can cool better.

At least a two-chamber system is created. The oil consumer is supplied from the second tank. This oil can cool beforehand and is largely air-free.

It is important here that the first tank is connected to the second tank via a connection which is arranged as near as possible to the tank bottom. A large part of the air is separated in the first tank as a result. In the second tank, the oil has the possibility of completely degassing.

The first and the second tank each advantageously have a vent. The at least two ventilated tanks, which are connected at the lowest point, allow rapid degassing of the air-oil mixture.

It is advantageous for the oil supply line to guide the oil up to a first level, wherein at least the second tank has a second, increased level. The oil supply is thus made possible solely as a result of the pressure differences between the tank and oil consumer.

In one embodiment, it is optimal for the oil level in the first tank to correspond to the oil level in the second tank, which can be achieved by suitably choosing the size of the connection and the dimensioning of the closure.

In an alternative embodiment, it is also possible for the oil level in the second tank to be higher or lower than in the first tank, which can in turn be achieved by the dimensioning of the connections.

The solution according to the invention makes possible an increase in the inflow quantity of oil and better cooling for the clutch components, since less foamed oil is in circulation. This allows installation space and through-flow cross sections to be reduced, since only the oil and not the oil-air mixture are delivered. The combination of the tanks results in rapid degassing of the oil.

It is precisely for a clutch that the invention is advantageous, since it is the case here that rotating components, for example a chain, or a clutch cage or a rotating shaft or a rotation of a wheel, introduce a large amount of air into the oil.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIG. 1 is a side cross-sectional view of an example embodiment of an oil consumer system.

DESCRIPTION

The drawing described herein are for illustrative purposes only of selected embodiments and not all possible implementations, and are not intended to limit the scope of the present disclosure.

The single FIGURE shows by way of example an oil consumer system 1. In the selected exemplary embodiment there is here illustrated a clutch device 2 as is known from the prior art. The clutch device 2 is accommodated in a 1st housing part 20a.

The clutch here is a wet-running multidisk clutch which is supplied with oil via an oil supply 12. The oil is guided by way of suitable oil supply bores 14 up to the disk carrier of the clutch, which is indicated by arrows in the drawing.

The rotation of the clutch causes oil to be flung out at the highest point of the clutch and fed to an oil return 11. Use can also be made here of oil channeling devices, as are already known. The oil channeling means is schematically illustrated in the drawing and can constitute a return line which is routed in the housing 20a, or a separate return line which is also arranged outside the housing 20a. The oil return line 11 opens in a first tank 4 in which the air-oil mixture settles. As indicated in the FIGURE, air 7 is separated from the oil drops 8. The rising air 7 escapes via a first vent 9. There here forms an oil level 6a in the first tank. The first tank 4 is connected to a second tank 5 via a connection 13. Here, the connection 13 is dimensioned such that oil can flow from the first tank into the second tank in a manner sufficient for the supply of the clutch device. In the second tank, the entrained air quantity has already been substantially reduced, the oil-air mixture can further expand there, and the air can escape via a second vent 10. There forms a second oil level 6b which can correspond to the first level 6a or else lie below or above the oil level 6a. The oil flows via the second tank 5, near the bottom thereof, into the oil supply 12.

The oil supply to the oil consumer, the clutch system 2, is maintained by the pressure of the liquid column in the second tank 5 with the level N2 in relation to the position of the oiling of the consumer at the level N1.

In the exemplary embodiment, the first tank 4 and the second tank 5 are mounted next to the housing 20a of the oil consumer, the clutch 2. However, it is also conceivable for the different tank volumes and the oil consumer to be combined in a common housing 20 to form an oil consumer system 1.

The first vent 9 and the second vent 10 take the form of separate openings in the embodiment. However, an embodiment is also conceivable in which the first tank vents into the second tank and a common vent is routed to the outside.

LIST OF REFERENCE DESIGNATIONS

1 Oil consumer system
2 Clutch device
3 Housing
4 First tank
5 Second tank
6 Oil level
7 Air
8 Oil drops
9 First vent
10 Second vent
11 Oil return
12 Oil supply
13 Connection
14 Oil supply bores
20 Housing
20a Oil consumer housing
N1, N2 Levels

What is claimed is:

1. An oil consumer system, comprising:
   at least one rotating component located in a consumer housing;
   a first oil tank and a second oil tank;
   an oil return line extending from the consumer housing to the first oil tank to pass an oil-air mixture from the consumer housing to the first oil tank;
   a top of at least one of the first oil tank and the second oil tank defining a vent configured to allow air in the at least one of the first oil tank and the second oil tank that has separated from the oil-air mixture to escape;
   a connection connecting the first and second oil tanks located along or adjacent to a bottom of the first and second oil tanks and configured to pass oil that has been separated from air in the first oil tank to the second oil tank; and
   at least one oil supply line extending from the second oil tank to the consumer housing, the at least one oil supply line defining an inlet for receiving oil located along or adjacent to the bottom of the second oil tank for providing oil that has been further separated from air in the second oil tank to the at least one rotating component in the consumer housing, and wherein oil exclusively passes to the consumer housing through the at least one oil supply line extending from the second oil tank, and wherein the second oil tank defines a sidewall between the top and bottom of the second oil tank, and wherein the at least one oil supply line extends from the sidewall of the second oil tank.

2. The oil consumer system as claimed in claim 1, wherein the at least one oil supply line guides oil to a housing oil level in the consumer housing, and wherein at least the second oil tank has a second oil level that is greater than the housing oil level.

3. The oil consumer system as claimed in claim 2, wherein a first oil level in the first oil tank is the same as the second oil level in the second oil tank.

4. The oil consumer system as claimed in claim 1, wherein a second oil level in the second oil tank is higher or lower than a first oil level in the first oil tank.

5. The oil consumer system as claimed in claim 1, wherein the oil consumer system is a clutch system.

6. An oil consumer system, comprising:
   a consumer housing defining a chamber containing at least one rotating component;
   a first oil tank and a second oil tank;
   at least one first dividing wall separating the first oil tank and the second oil tank, and at least a second dividing wall dividing the second oil tank from the consumer housing;
   an oil return line extending from the consumer housing to the first oil tank to pass an oil-air mixture from the consumer housing to the first oil tank;
   a top of the first oil tank and a top of the second oil tank each defining a vent configured to allow air in the first and second oil tanks that has separated from the oil-air mixture to escape;
   a connection connecting the first and second oil tanks along or adjacent to a bottom of the first and second oil tanks, and configured to pass oil that has been separated from air to pass from the first oil tank to the second oil tank; and
   at least one oil supply line extending from the second oil tank to the chamber of the consumer housing, the at least one oil supply line defining an inlet for receiving oil located along or adjacent to the bottom of the second oil tank for providing oil that has been further separated from air in the second oil tank to pass to the at least one rotating component in the consumer housing, and wherein oil exclusively passes to the chamber of the consumer housing through the at least one oil supply line extending from the second oil tank, and wherein the second oil tank defines a sidewall between the top and bottom of the second oil tank, and wherein the at least one oil supply line extends from the sidewall of the second oil tank.

7. The oil consumer system as claimed in claim 6, wherein the at least one oil supply line guides the oil to a housing oil level in the consumer housing, and wherein at least the second oil tank has a second oil level that is greater than the housing oil level.

8. The oil consumer system as claimed in claim 7, wherein a first oil level in the first oil tank is the same as the second oil level in the second oil tank.

9. The oil consumer system as claimed in claim 6, wherein a second oil level in the second oil tank is higher or lower than a first oil level in the first oil tank.

10. The oil consumer system as claimed in claim 6, wherein the oil consumer system is a clutch system.

\* \* \* \* \*